Patented Apr. 10, 1934

1,954,236

UNITED STATES PATENT OFFICE 1,954,236

FILTERING MATERIAL AND METHOD

Victor C. Benjamin, Los Angeles, Calif.

No Drawing. Application May 25, 1931,
Serial No. 540,011

2 Claims. (Cl. 210—205)

My invention pertains to the art of filtering liquids, and specifically to the separation from nonaqueous liquids of finely divided sediments and sludges, which may approach a colloidal consistency.

My invention refers specifically to the preparation and use of filtering clays formed into strongly compacted and relatively dense plates or other forms, these plates having considerable strength and solidity but not such degree of hardness as to prevent the shaving of a very thin superficial layer from the intake side of the plate during the period of use.

I have discovered that if certain clays and clay-like materials are ground to a relatively fine mesh, wetted with water, formed into a plate and suitably dried, I obtain a filtering medium which has certain properties not heretofore observed and which I believe to be valuable.

In the various oil trades many cases occur where the oil to be purified contains coloring matters and other impurities both in solution and in suspension. For example, used lubricating oils contain dissolved coloring matter, finely divided free carbon and emulsified water. Acid treated lubricating oils retain, even after long settling, traces of viscous acid sludge in a state of extreme subdivision. Cleaner's naphtha contains traces of dissolved fats and oils together with microscopic dust and lint. Vegetable oils contain mucilaginous "foots" and, often, finely crystalline stearin.

Heretofore it has been the custom to purify such oils by bringing them into contact with granular or powdered solids having adsorbent or absorbent properties, such as clays, fuller's earth, bone char, diatomaceous earth and the like. By reason of the above properties these solids deprive the oil of a desired proportion of the dissolved coloring matter or other impurity and, when the spent adsorbent is subsequently removed from the oil (as by straining through a filter cloth), such impurities as were originally in the suspended condition are entrained in the mass and are thus simultaneously removed.

This simple and convenient procedure is efficient in cases where the impurities which it is desired to remove are actually in solution, but where there is any appreciable proportion of suspensoids it is liable to be highly ineffective. As the suspensoids are uniformly distributed through the mass of adsorbent accumulating on the filter cloth, a large excess of the adsorbent must be used in order to firmly retain the suspensoids, which pass freely through the cloth if they are displaced from the press cake. Further, if the suspensoids are of a semi-liquid or gummy consistency (as acid sludges, foots and colloidal asphalt, for example) they coat the adsorbent grains with an adherent layer which causes the entire mass to compact and cement on the filter cloth, preventing the removal of the adsorbent from the oil unless an extravagant quantity of the adsorbent be used. Oils containing material quantities of such mucilaginous suspensoids as vegetable oil foots will often refuse to filter until the dose of adsorbent becomes so great as to absorb practically the entire bulk of the oil.

I have discovered that by forming fine grains of suitable clays or other solid materials having at least absorbent and, preferably, some adsorbent properties into a dense and solid plate, passing the liquid to be filtered through this plate and shaving away the intake surface of the plate as fast as it becomes choked with sediment, I may remove from oils the mucilaginous or tarry suspensoids which have hitherto resisted filtration, with a very moderate consumption of the filtering material. I have further discovered that many dark colored impurities heretofore considered to be in solution are actually in suspension and may be removed with the superficial layer without passing into the body of the plate.

In putting my invention into practice I select a suitable absorbent material and reduce into a comminuted condition; mix the ground material with water, in some cases adding a binding material; form the aqueous mud into a plate, cylinder or other shape suited to the type of filter press in which it is to be used; solidify the plate by removing a part or all of the free water; place the plate in the press, in case it has not been formed in situ; bring the liquid containing suspended matter into pressural contact with one side of the plate, withdrawing from the opposite side the clear liquid which passes through; and continuously or intermittently shave or abrade from the entering side of the plate the accumulated or accumulating layer of sediment together with the thinnest possible slice of the material of the plate. This final operation will, if the structure of the plate be properly adapted to the work to be done, almost or completely restore the flow rate of liquid through the plate by exposing a fresh and unclogged surface, and may thus be continued or repeated until the plate becomes too thin for further use.

Selection of material

The properties desired are high porosity or absorbent value, the highest possible cementing value and the lowest shrinkage on drying. These properties are obviously more or less contradictory and are not likely to be found in perfect combination in any one naturally occurring material. The nearest approach which I have yet discovered is a clay-like material, probably containing a considerable proportion of hydrous magnesium silicate, occurring some thirteen miles east of Olancha Station in the Owens River Valley, Inyo County, California. This material has a high degree of porosity, slacks very slightly on admixture with water, has a relatively low shrinkage on drying and has sufficient cementing power to permit the formation of cakes of the desired degree of firmness without the addition of any binder. The hydrous magnesium silicate produced from the well known deposit in the Amaragossa Valley in Nye County, Nevada, has a very desirable porosity and freedom from shrinkage, but lacks sufficient cementing power to permit the handling of cakes made without the use of a binder. It may, however, be used for forming filtering cakes in situ.

The floridins as a class have a tendency to slack and in mixing them an excess of water or of agitation should be avoided. Their cementing value is satisfactory, as is the porosity, and the shrinkage is within reason if the clays are not allowed to become slacked and mudded when mixed with water. Bentonite and very fat clays are entirely unsuited to my purpose as, while they form extremely strong plates, they have an excessive shrinkage and the dried material is too dense to permit any satisfactory flow rate of liquid. The diatomaceous earths have an excessive porosity and no cementing property. They may be used in connection with clays having good cementing properties or, for some purposes, they may be mixed with a binder or plates may be cut from the solid material as mined.

Comminution

The fineness to which the clay should be ground will vary with the density required in the finished plate and with the nature of the clay or other raw material. In general terms the fineness of grinding should be increased as the tendency to water slack decreases, and obviously finer grinding will increase the density of the finished plate. Referring to the Olancha clay, to make a plate suitable for the filtration of cleaners' naphtha (which contains only solid suspensoids in a condition of extreme fineness) I would grind one portion of the clay to 30/60 mesh and another portion to minus 200 mesh and mix three parts by weight of the coarse grind with one part by weight of the fines. A plate suited for removing acid sludge from acid treated gasoline or lubricating oils or for removing foots from vegetable oils may be produced by using say three parts of 60/120 mesh to one part of minus 200 mesh. This gives a denser plate, which is necessary to prevent penetration of the semi-liquid sludge or foots into the pores of the plate. It will be understood that the successful practice of my invention depends on keeping the suspended bodies on the immediate entering surface of the plate as, if they are allowed to enter the pores or channels existing in the plate, it will become choked throughout and cannot be reestablished by shaving away its outer surface.

Forming the plate

My invention is susceptible to two modifications, in the first of which the plate is formed outside of the filtering press, is brought to a consistency at which it will stand handling, and is finally placed in position in the press. In this modification sufficient water is added to the clay mixture to produce either a thickly fluent mud or a merely dampened grain, depending on whether the cake is to be formed by flowing or under pressure. For flowing I use a mould having a perforated bottom, over which is spread a layer of canvas, and sides of such height and contour as to form a cake of the desired outline and thickness. A thickly fluent mud is poured into this mould and air is passed through the plate, either by evacuating a chamber formed below the mould or by applying air under pressure to the upper surface of the plate, until the entrained water is displaced and the plate is rendered dry enough to remove from the mould. I then place it in a drying oven in which the temperature is slowly and carefully raised until the desired degree of dryness is obtained, this always being below the point at which water of hydration is completely removed from the clay. It is desirable to dry very slowly and the final temperature should not exceed 230° F. and may well be kept materially lower.

The same procedure may be followed for forming cakes under pressure with the exception that the clay is merely dampened and the mould is provided with a hydraulic piston or other means for applying high pressure. The purpose of the pressure is merely to rapidly remove the entrained water and the drying step is still essential. The forming of cakes by flowing is more tedious than when they are formed under pressure, but for plates of large size, in particular, a more even density is obtained by the former method. The dampened clay grains do not flow materially under pressure and a plate of large area is likely to be of uneven density over its area if formed in this manner.

In the second modification the plate is formed in or on the filter press in which it is to be used. For this purpose it is desirable to operate with a fairly fluid mud. If the press is provided with horizontal plates a layer of the mud is flowed over them and air passed through until the entrained water is substantially displaced and shrinkage cracks develop. A second layer of mud, preferably of less thickness, is then flowed over the plate and the entrained water blown out as before. This heals the first series of shrinkage cracks but the second layer is likely to develop smaller cracks. The process is repeated until a cake free from entrained water and without cracks is obtained. A certain amount of practical experience is required to rapidly produce such a cake. Heated air or other dry gas is then passed through the plate until the desired proportion of water has been removed and a firm and solid consistency is obtained.

It is also possible and in fact highly desirable to form my improved filtering medium on the revolving drum of the well known type filter press in which the lower portion of the drum revolves in a feed tank. For this purpose the press must be equipped with a cover and a means for supplying heated air to the outside of the drum and the automatic cutout valve must be removed so that all parts of the drum will be constantly under suction, this condition persisting when the press is in use as a filter after the formation of the cake. In forming the cylindrical plate a rather thin aqueous suspension of the ground clay is introduced into the feed tank to such a level as to contact with only a few inches of the circumference of the drum. This thin mud should be kept in agitation by any mechanical means—air agitation is not desirable as it is likely to produce an uneven plate. The drum is slowly revolved, a reduced pressure being maintained in the usual manner, a constantly increasing thickness of cake being thus built up. The scraping knife with which such presses are usually equipped is removed.

As the cake very slowly revolves the entrained water will be withdrawn from the portion out of contact with the mud and a cake of the greatest evenness as to density and entirely free from shrinkage cracks may thus be accumulated. When the cake or cylinder has reached the desired thickness the mud is withdrawn from the feed tank, the drum being kept in revolution while a supply of moderately warm or hot air is drawn through the clay until the cylinder reaches the desired degree of hardness.

Control of drying

The extent to which the drying of the plate may be carried is definitely limited at one end of the scale by the requirement that all the water of hydration shall not be removed from the clay. If dehydration is carried to the point where the combined water is entirely removed the value of the plate for my purpose will usually be completely destroyed. It should be pointed out that the action of a burned or fired tile is entirely different from that produced by my dried but unburned plate, apparently for the reason that the sintering of the clay particles composing a fired tile destroys the exterior roughness of the clay grains of which it is composed and causes the pores and channels through the tile to have a smooth surface which readily permits the entry of semiliquid sludges and of solid particles having a diameter less than the diameter of the pore. The entire body of the tile, rather than its intake surface, thus becomes choked with sediment and its efficiency cannot be restored by scraping away its outer surface, even if it were practical to effect such a scraping action on a burned tile. The tile, therefore, may be considered an efficient means for removing solid particles of a diameter greater than the diameter of its pores, but entirely inefficient and valueless as a means for removing sludges or suspended particles approaching colloidal dimensions, and it has been shown by experience that burned tiles are entirely valueless for these purposes. In my dried and hardened but not burned plate the clay grains retain their original superficial porosity unimpaired, and this rough and porous surface apparently leads to an agglomeration of the finer particles, and in particular any gummy and mucilaginous substances, immediately on the entering surface of the plate, so that there is practically no penetration of the suspensoids into the body of the plate itself.

If the plates are to be formed outside of the press so that they must be transported and/or handled, drying must be continued to the point where the plate will stand this amount of abuse. This usually means to the point where free water is entirely eliminated. If the plates or cylinders are formed in place, in or on the press, the drying step does not have to be carried so far but may be discontinued at the point where the cake is sufficiently firm to stand the shaving away of its outer surface without ravelling under the knife or trimming tool. This degree of hardness or firmness is essential as, for economic reasons, only a thin slice from the entering side of the cake may be removed in taking off the sediment and it is obviously necessary to maintain a smooth and even surface for this purpose. Under these conditions it is obvious that the extent to which drying is carried will be controlled to a large degree by the cementing value of the clay of which the plate or cylinder is composed.

I have found that where the plate or cylinder is formed in the press and is to be used for filtering hot oil it is not necessary to carry the drying further than to the substantial removal of the entrained water. On applying an oil at a temperature near or above the boiling point of water, all water which cannot be shown out by cold air is rapidly evaporated and driven through the plate, emerging as steam with the first filtrate. Plates so formed appear to be practically as tough and dense as those formed by drying with heated air, or in an oven. If the clay has high cementing power and the plates are to be used for the filtration of liquids of low viscosity, such as gasoline, it is possible to form them in this manner without utilizing hot oil for drying, the first throughput of filtrate rapidly carrying away any remains of entrained water. Whatever adsorptive and decolorizing value there may be in the clay of which the plate is composed is thus lost. Such plates are suited to the removal of acid sludge from gasoline and cold lubricating oils of low viscosity, or foots from fatty oils.

Use of binders

While the use of binders is not usually desirable, it is possible to employ them in connection with extremely short clays, chars or hydrous magnesium silicate. Minute proportions of Portland cement may be added to the dry clay or the water used for dampening the ground material may contain small quantities of glue, sodium silicate, sugar or other adhesive material. The use of binders should be resorted to only when it is impossible to form a sufficiently firm cake without them as they necessarily reduce the porosity of the cake and also the absorptive value of the clay of which the cake is composed. It will also be obvious that binders can be used only when the cake is to be thoroughly dried previous to use.

Operation of filtering

Where the plates are formed outside the press they must be in the form of flat plates or discs and means must be provided in the press itself for sealing the plates into place with some material unaffected by the liquid which is to be filtered. If the plates are formed in situ this necessity is avoided as the plate will spontaneously take the shape of the supporting medium, which would ordinarily be a layer of filtering canvas placed on the corrugated metal of a flat plate press or on the perforated drum of a rotating filter. In any case means must be provided for mechanically scraping, shaving or otherwise abrading from the entering surface of the plate the very thin layer above referred to and for conducting the shavings, together with the sediment, to a position in the lower part of the press enclosure or, in the case of a drum filter, to a point outside the shell. In the case of the drum type of filter a suitable mechanical arrangement comprises a cutting tool mounted on a carriage arranged to traverse the length of the cylinder, as by means of a constantly revolving reversible feed screw, the whole arrangement being comparable to the carriage of the well known engine lathe carrying a narrow finishing tool. Arrangements should also be provided for reversing the direction of the carriage and for feeding the cutting tool a minute distance, say 1/100 of an inch, into the face of the cake at the end of each complete traverse.

I do not, in the present application, claim any invention in filtering apparatus and the above description is intended only to indicate the general manner of application of the solid filtering medium which in part comprises my invention. A great number of possible means for removing a superficial shaving are well known to those skilled in the art.

I am well aware that methods have been proposed for forming a filtering bed of unconsolidated grains of sand and for scraping away the upper and entering portions of such bed as it becomes choked by the accumulation of sediment. I am also aware that it is customary, in the well known precoating operation, to build up filtering layers of finely comminuted diatomaceous earth and that the scraping or shaving operation which I propose might, in view of the first named prior art operation, be applied to the precoat cakes formed in the second.

This combination is not the equivalent of the invention claimed herein for the reason that in the prior art operations the grains forming the cake or bed are not consolidated. I use a clay having cementing power in the presence of water, or a material having no intrinsic cementing power in combination with a binding material. The plates which I thus cement and consolidate with the aid of water are useful only for the filtration of nonaqueous liquid, the application of water to such plates entirely destroying their value for my purpose. The filtering layers or cakes of the prior art methods of precoating are formed by suspending the comminuted mineral in the liquid to be filtered or in another liquid of the same general character, and the layers thus formed have neither the density requisite to prevent the entry of sludges and extremely fine sediments into the channels through the cakes nor the firmness of texture which would permit the shaving from them of a thin superficial layer without disturbance to that portion of the cake lying beneath the shaving tool. My invention is of a filtering medium which is thoroughly consolidated and brought to a substantial and material degree of hardness and toughness; of a filtering medium suited solely to the filtration of nonaqueous liquids; of a manner of producing such a medium by treating the clay with water to bring it into a plastic form and removing sufficient of the water to produce the requisite toughness of texture prior to the passage of the nonaqueous liquid through the medium, and of a method of renewing the effectiveness of such medium by removing its outermost layers as it becomes coated with sediment.

I would have it understood that my invention is not directed to the decolorization of oils except insofar as they may be decolorized by the removal of dark colored matter in suspension. It is true that the clays of which I prefer to form my filtering plate have some adsorptive value, this being true of practically all clays and that in the passage of the oil through the body of the plates a limited removal of coloring matter from solution may be effected. It will be obvious, however, that the described means of applying a decolorizing clay to an oil must necessarily be highly ineffective for the removal of dissolved coloring matter, and that such decolorization by adsorption as is thus effected is entirely incidental and fortuitous and is not the object of my invention.

I claim as my invention:

1. A filtering medium: a moulded, unburned, strongly compacted porous plate composed of disintegrated and water-cemented unburned clay-like material, substantially free from entrained liquid.

2. An unburned, strongly compacted porous plate composed of unburned clay-like material and having substantially the properties of a dried green brick.

VICTOR C. BENJAMIN.